United States Patent
Clarke

(10) Patent No.: US 9,459,051 B2
(45) Date of Patent: Oct. 4, 2016

(54) HEAT EXCHANGER FOR HORIZONTAL INSTALLATION UNDER A MOTORCYCLE ENGINE

(76) Inventor: Allan J. Clarke, Helena, MT (US)

(*) Notice: Subject to any disclaimer, the term of this patent is extended or adjusted under 35 U.S.C. 154(b) by 781 days.

(21) Appl. No.: 13/596,004

(22) Filed: Aug. 27, 2012

(65) Prior Publication Data

US 2012/0325427 A1    Dec. 27, 2012

Related U.S. Application Data

(63) Continuation of application No. 11/834,351, filed on Aug. 6, 2007, now abandoned.

(60) Provisional application No. 60/835,853, filed on Aug. 4, 2006.

(51) Int. Cl.

| | |
|---|---|
| *B60H 3/00* | (2006.01) |
| *F28D 1/04* | (2006.01) |
| *B62K 11/04* | (2006.01) |
| *F01M 5/00* | (2006.01) |
| *F28D 1/02* | (2006.01) |
| *F28D 21/00* | (2006.01) |

(52) U.S. Cl.
CPC .............. *F28D 1/04* (2013.01); *B62K 11/04* (2013.01); *F01M 5/002* (2013.01); *F28D 2001/028* (2013.01); *F28D 2021/0089* (2013.01); *F28D 2021/0092* (2013.01)

(58) Field of Classification Search
CPC ... B62K 11/04; F28D 1/04; F28D 2001/028; F28D 2021/0089; F28D 2021/0092; F01M 5/002
USPC ...... 165/41, 44, 51, 52; 180/68.1, 68.4, 68.6
See application file for complete search history.

(56) References Cited

U.S. PATENT DOCUMENTS

| | | | | |
|---|---|---|---|---|
| 2,067,758 A | * | 1/1937 | Flogaus | 180/68.1 |
| 3,838,668 A | * | 10/1974 | Hays | F01P 9/02 |
| | | | | 123/41.2 |
| 3,884,293 A | * | 5/1975 | Pessolano et al. | 165/51 |
| 3,945,454 A | * | 3/1976 | Kinoshita et al. | 180/68.4 |
| 4,016,945 A | * | 4/1977 | Shibata | B62M 7/02 |
| | | | | 180/229 |
| 4,019,595 A | * | 4/1977 | Imai | B62J 17/00 |
| | | | | 165/51 |
| 4,180,137 A | * | 12/1979 | Wagner | 180/68.4 |
| 4,280,582 A | * | 7/1981 | Kouyama et al. | 180/219 |
| 4,295,964 A | * | 10/1981 | Preisler | 210/130 |
| 4,334,589 A | * | 6/1982 | Asakura et al. | 180/219 |
| 4,428,451 A | * | 1/1984 | Yamaoka | F01P 3/18 |
| | | | | 123/65 EM |
| 4,445,587 A | * | 5/1984 | Hillman | 165/44 |
| 4,461,366 A | * | 7/1984 | Honda | 165/41 |
| 4,478,306 A | * | 10/1984 | Tagami | B60K 11/04 |
| | | | | 165/41 |
| 4,516,630 A | | 5/1985 | Yamaguchi | |

(Continued)

*Primary Examiner* — Ljiljana Ciric
(74) *Attorney, Agent, or Firm* — Pederson and Company, PLLC; Ken J. Pedersen; Barbara S. Pedersen

(57) ABSTRACT

A motorcycle has a heat exchanger adapted to be installed on the motorcycle in a substantially horizontal orientation. Also, the heat exchanger is adapted to be installed on the motorcycle beneath the engine, crankcase, oil pan and/or gearbox without substantial vertical orientation and not attached directly to the engine, except by cooling fluid connectors. Preferably, the heat exchanger is made with finned tubular core elements. The heat exchanger is installed in a suspended manner beneath the motorcycle, so that cooling air may pass over its top and bottom surfaces. Preferably, the heat exchanger is an oil intercooler.

7 Claims, 4 Drawing Sheets

(56) References Cited

U.S. PATENT DOCUMENTS

| | | | |
|---|---|---|---|
| 4,519,473 A * | 5/1985 | Ochiai et al. | 165/41 |
| 4,537,273 A * | 8/1985 | Funabashi | B60K 11/04 180/229 |
| 4,557,345 A * | 12/1985 | Hamane et al. | 180/68.1 |
| 4,564,081 A * | 1/1986 | Hamane et al. | 180/68.1 |
| 4,577,720 A * | 3/1986 | Hamane et al. | 180/68.1 |
| 4,589,512 A * | 5/1986 | Yamaguchi | F28D 1/0471 165/41 |
| 4,618,020 A * | 10/1986 | Noda et al. | 180/68.1 |
| 4,621,680 A * | 11/1986 | Funabashi | 165/44 |
| 4,632,206 A * | 12/1986 | Morinaka et al. | 165/41 |
| 4,633,965 A * | 1/1987 | Tsurumi et al. | 165/41 |
| 4,640,341 A | 2/1987 | Ozawa | |
| 4,660,624 A * | 4/1987 | Yamaguchi | F28D 1/0471 165/41 |
| 4,662,470 A * | 5/1987 | Fujisawa | B60K 11/00 165/44 |
| 4,667,758 A * | 5/1987 | Tamura | 180/68.4 |
| 4,685,530 A * | 8/1987 | Hara | 180/68.4 |
| 4,687,069 A * | 8/1987 | Inomata et al. | 180/68.4 |
| 4,703,825 A * | 11/1987 | Mikami et al. | 180/68.1 |
| 4,709,774 A * | 12/1987 | Saito et al. | 180/68.1 |
| 4,830,135 A * | 5/1989 | Yamashita | 180/68.1 |
| 4,876,778 A * | 10/1989 | Hagihara | B21D 53/085 29/428 |
| 4,964,484 A * | 10/1990 | Buell | 180/68.1 |
| 4,995,448 A * | 2/1991 | Inagaki et al. | 165/44 |
| 5,244,036 A | 9/1993 | Michl | |
| 5,303,770 A | 4/1994 | Dierbeck | |
| 5,307,865 A * | 5/1994 | Inagaki et al. | 165/41 |
| 5,363,823 A * | 11/1994 | Gittlein | 184/104.3 |
| 5,383,517 A | 1/1995 | Dierbeck | |
| D372,213 S | 7/1996 | Blennov | |
| 5,566,746 A | 10/1996 | Reise | |
| 5,653,206 A | 8/1997 | Spurgin | |
| 5,715,778 A | 2/1998 | Hasumi et al. | |
| 5,715,904 A * | 2/1998 | Takahashi et al. | 180/68.1 |
| 5,901,808 A | 5/1999 | Swenson et al. | |
| 5,992,554 A * | 11/1999 | Hasumi | B60K 11/04 123/41.51 |
| 6,102,149 A * | 8/2000 | Suzuki et al. | 180/68.1 |
| 6,315,072 B1 * | 11/2001 | Brown et al. | 180/228 |
| 6,332,505 B1 * | 12/2001 | Tateshima | B62K 11/00 180/229 |
| D461,157 S * | 8/2002 | Myers et al. | D12/216 |
| 6,871,628 B1 * | 3/2005 | Tauer | 165/44 |
| 6,994,150 B1 * | 2/2006 | Kline | B62J 27/00 123/196 AB |
| 7,077,230 B2 * | 7/2006 | Arnold | 180/68.4 |
| 7,140,329 B2 * | 11/2006 | Ohzono et al. | 180/68.4 |
| 7,143,854 B2 * | 12/2006 | Arnold | 180/68.3 |
| 7,159,682 B2 * | 1/2007 | Arnold | 180/68.4 |
| 7,188,696 B2 * | 3/2007 | Arnold | 180/68.1 |
| 7,318,405 B2 * | 1/2008 | Tanaka et al. | 123/195 C |
| 7,404,463 B2 * | 7/2008 | Saiki et al. | 180/68.4 |
| 7,513,328 B2 * | 4/2009 | Shigeta et al. | 180/225 |
| 7,527,115 B2 * | 5/2009 | Tsuya | 180/68.2 |
| 7,708,099 B2 * | 5/2010 | Oodachi et al. | 180/229 |
| 7,779,950 B2 * | 8/2010 | Hoeve et al. | 180/68.3 |
| 7,931,290 B2 * | 4/2011 | Walser | 180/68.4 |
| 8,267,054 B2 * | 9/2012 | McMillan | 123/41.49 |
| 8,424,589 B2 * | 4/2013 | McMillan et al. | 165/41 |
| 8,967,090 B2 * | 3/2015 | Inoue et al. | 123/41.01 |
| 9,061,727 B2 * | 6/2015 | Iijima | B62K 11/04 |
| 2003/0066697 A1 * | 4/2003 | Kodan et al. | 180/68.4 |
| 2005/0139403 A1 | 6/2005 | Gokan et al. | |
| 2005/0284677 A1 * | 12/2005 | Arnold | 180/68.4 |
| 2006/0065455 A1 * | 3/2006 | Saiki et al. | 180/68.4 |
| 2007/0045025 A1 * | 3/2007 | Hasegawa et al. | 180/228 |
| 2009/0020261 A1 * | 1/2009 | McMillan et al. | 165/44 |
| 2009/0038580 A1 * | 2/2009 | Hamilton | 123/196 AB |
| 2009/0139473 A1 * | 6/2009 | McMillan | 165/41 |
| 2009/0218156 A1 * | 9/2009 | Walser | 165/44 |
| 2011/0114044 A1 * | 5/2011 | Dees | F02F 1/40 123/41.82 R |

* cited by examiner

HEAT EXCHANGER FOR HORIZONTAL INSTALLATION UNDER A MOTORCYCLE ENGINE

This application is a continuation of U.S. Non-Provisional application Ser. No. 11/834,351, filed Aug. 6, 2007, which is incorporated herein by this reference and which claims priority of Provisional Application Ser. No. 60/835,853, filed Aug. 4, 2006, and entitled "Motorcycle Heat Exchanger", which is also hereby incorporated by reference.

BACKGROUND OF THE INVENTION

1. Field of the Invention

This invention relates generally to vehicles, and to heat exchangers for vehicles. More specifically, this invention relates to motorcycle heat exchangers, especially oil intercoolers for motorcycles.

2. Related Art

Historically, motorcycle engines have frequently been air cooled only, without water jackets, cooling water circuits or radiators. Lately, motorcycle engines are more frequently water cooled, with conventional water cooling and heat exchange equipment similar to cars and trucks. Still, it is infrequent that motorcycle engine lubricating oil is cooled separately from the engine block and crankcase. Therefore, for large-displacement and/or high-performance motorcycle engines, high lube oil temperature is a common problem, resulting in premature lube oil degradation and excessive engine wear and tear.

Typically if used, the heat exchanger or radiator when mounted on a motorcycle is mounted in front of the engine, usually in a substantially vertical orientation, and usually attached to the descending front frame tubes or to the front of the engine. For motorcycle heat exchanges like this, see, for example:

| 1. | Yamaguchi | USP# 4,516,630 |
|---|---|---|
| 2. | Ozawa | USP# 4,640,321 |
| 3. | Michl | USP# 5,244,036 |
| 4. | Blennov | USP# D372,213 |
| 5. | Spurgin | USP# 5,653,206 |
| 6. | Hasumi, et al. | USP# 5,715,778 |
| 7. | Swenson, et al. | USP# 5,901,808, and |
| 8. | Gokan, et al. | US Publication# US2005/0139403A1 |

Still, there is a need for an efficient, secure and aesthetic placement of a motorcycle heat exchanger which does not extend in front of the engine, does not require substantially vertical orientation, and is not attached to the descending front frame tubes or to the front of the engine. Other placement choices give the heat exchanger designer different options for efficiency, security and aesthetics. This invention addresses those needs.

SUMMARY OF THE INVENTION

The present invention is a heat exchanger for the engine of a motorcycle which is adapted to be installed on the motorcycle in a substantially horizontal orientation. Also, the present invention is a heat exchanger for a motorcycle which is adapted to be installed on the motorcycle beneath the engine and/or beneath the crankcase and/or beneath the oil pan and/or beneath the gearbox.

Surprisingly, what the inventor has discovered is that beneath the motorcycle in motion is substantial moving air available for cooling heat exchange. Also, this moving air apparently has substantial turbulence, increasing its heat exchange capacity. Therefore, a heat exchanger placed in this area underneath the motorcycle may be effective. In addition, a heat exchanger placed in this area may also be secure and aesthetic.

Preferably, the heat exchanger is made with finned tubular core elements. At the location under the motorcycle, the thinness of the heat exchanger is important, so preferably it is made with thin hollow plates. Appropriate fluid connectors for the cooling circuit, from the engine to the heat exchanger, and back to the engine, may be conventionally provided. Also, conventional flow control through the cooling circuit may also be provided.

Preferably, the heat exchanger is installed in a suspended manner beneath the motorcycle, so that cooling air may pass effectively over both its top and bottom surfaces.

Preferably, the heat exchanger is an engine oil intercooler. However, the heat exchanger may also be an engine cooling water radiator.

DETAILED DESCRIPTION OF THE INVENTION

Referring to the Figures, there are shown some, but not the only, embodiments of the invented motorcycle heat exchanger.

Figure 1:
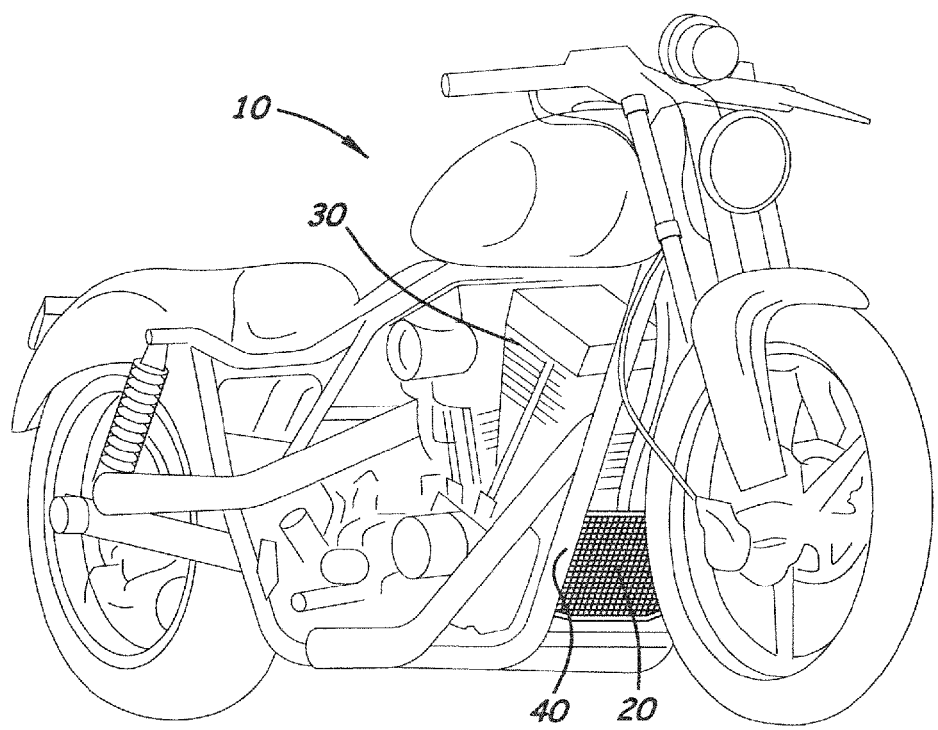
FIG. 1 is a side, perspective view of a motorcycle with a prior art placement of a heat exchanger in front of the engine, in a substantially vertical orientation, and attached to the descending front frame tubes of the motorcycle.

In FIG. 1 is depicted a prior art motorcycle 10 with heat exchanger 20 placed conventionally in front of the engine 30 in a substantially vertical orientation. Heat exchanger 20 is secured conventionally to descending front frame tube 40.

Figure 2A:
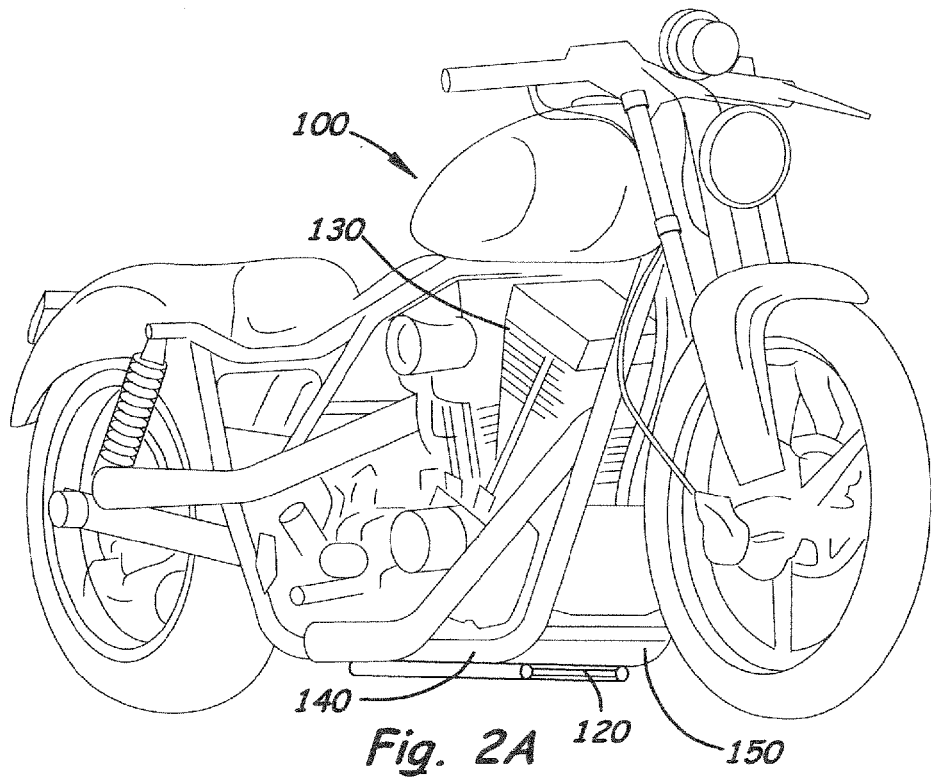
FIG. 2A is a side, perspective view of a motorcycle according to an embodiment of the invention, with a heat exchanger beneath the engine in a substantially horizontal orientation, and attached so that it is placed beneath the bottom frame tubes of the motorcycle.

In FIG. 2A is depicted an embodiment of the present invention. Motorcycle 100 has heat exchanger 120 placed uniquely beneath the engine 130 in a substantially horizontal orientation. Heat exchanger 120 is secured uniquely beneath the bottom of horizontal bottom right frame tube 140 and bottom left frame tube 150.

Figure 2B:
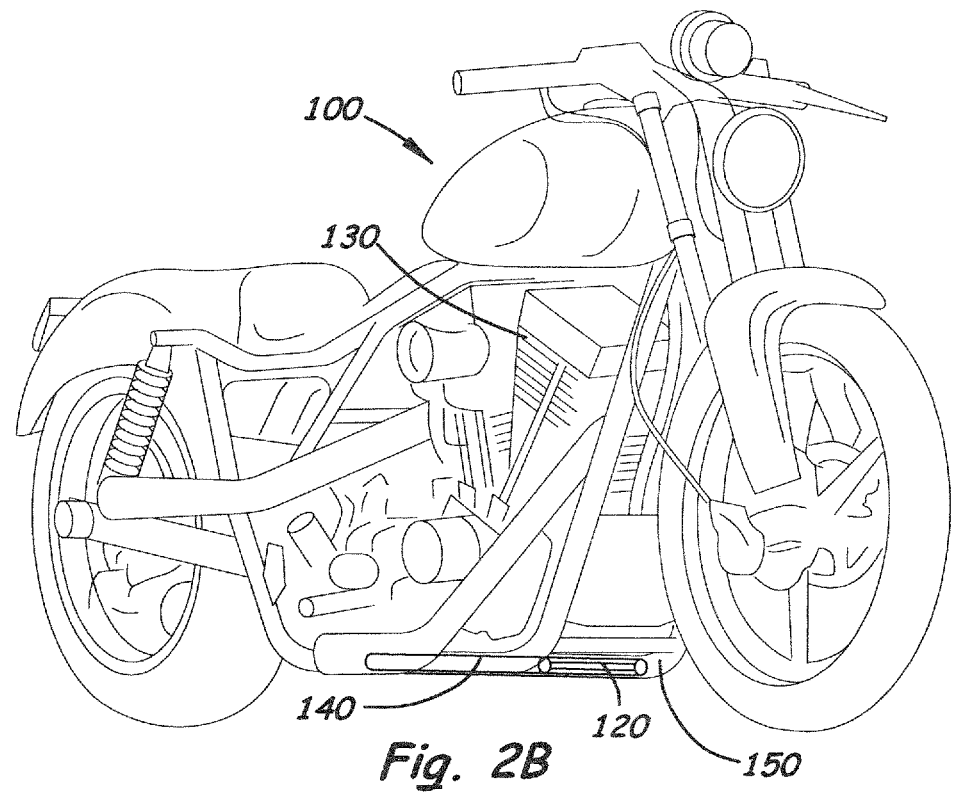
FIG. 2B is a side, perspective view of an alternate embodiment of the invention wherein the heat exchanger is attached so that it is placed between the bottom frame tubes of the motorcycle.

In FIG. 2B is depicted an alternate embodiment of the invention wherein heat exchanger 120 is placed uniquely between right frame tube 140 and left frame tube 150.

Figure 3:
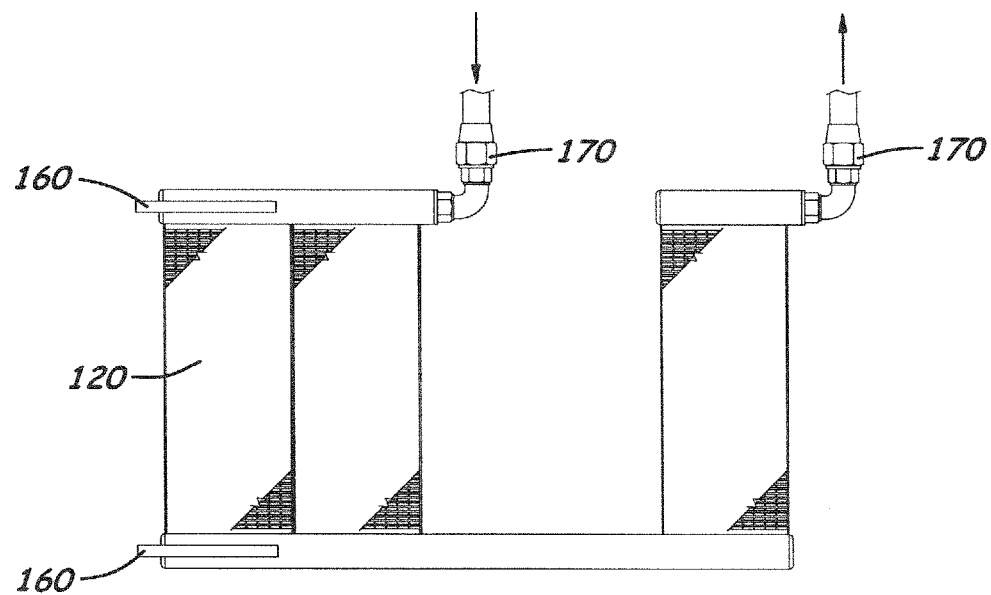
FIG. 3 is a top, schematic view of one embodiment of the heat exchanger of the invention.

In FIG. 3 is depicted a top view of an embodiment of heat exchanger 120, with mounting tabs 160 and liquid cooling circuit fluid connectors 170. Connectors 170 enable flow to exchanger 120 from the engine 130 (not shown in this Figure) through exchanger 120 and back to engine 130, as indicated by the arrows.

Figure 4:
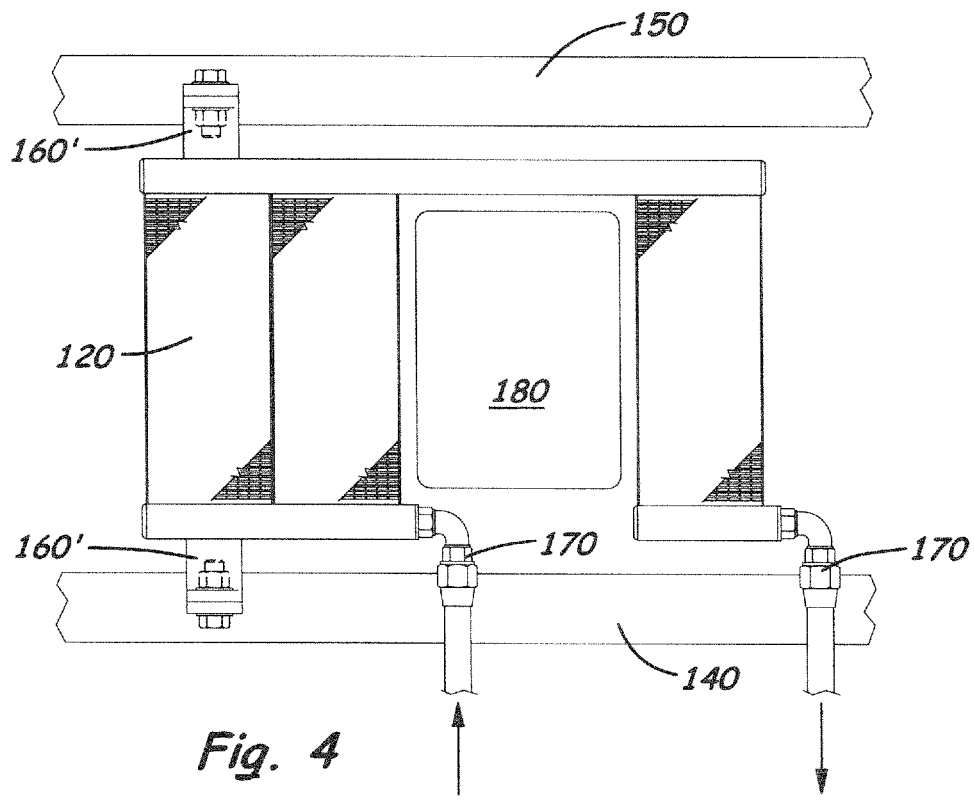
FIG. 4 is a bottom, schematic view of an alternative embodiment similar to the embodiment depicted in FIG. 3.

FIG. 4 depicts a bottom view of an embodiment of the invention similar to the one depicted in FIG. 3, but with different mounting tabs 160'. Also shown in this FIG. 4 are right bottom frame tube 140 and left bottom frame tube 150, as well as the bottom surface 180 of the oil pan, or crankcase bottom, of the engine 130 of motorcycle 100.

Figure 5:
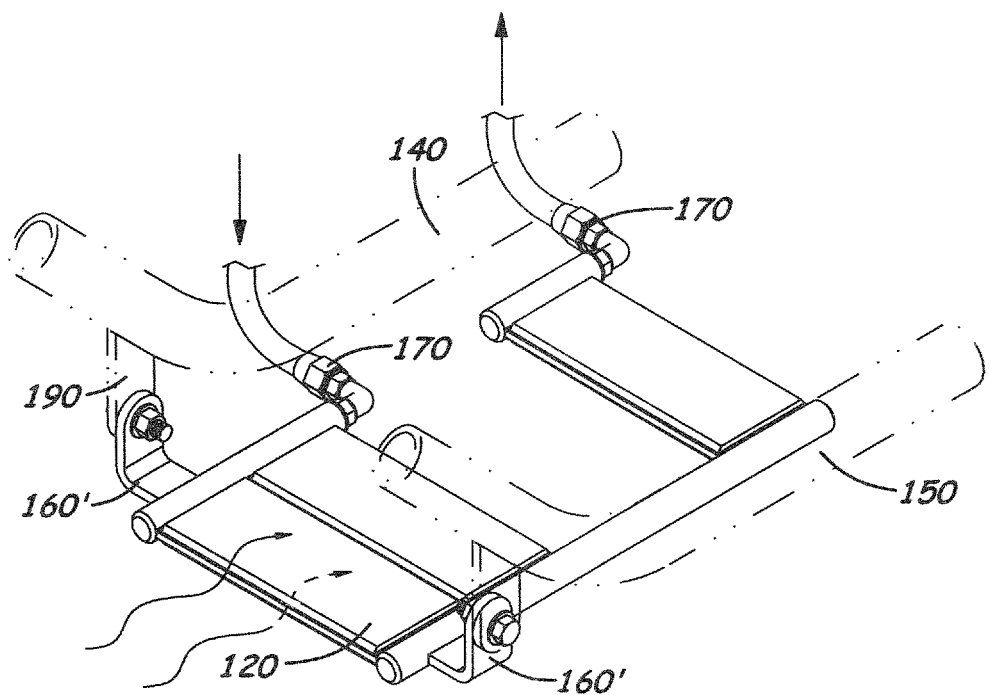
FIG. 5 is a top perspective schematic view of the installation of the embodiment of the invention depicted in FIG. 2A.

In FIG. 5 is depicted a top perspective schematic view of the embodiment of the invention depicted in FIG. 4. In this Figure, it is clear that heat exchanger 120 is placed substantially horizontally, and beneath bottom frame tubes 140 and 150.

Figure 6A:
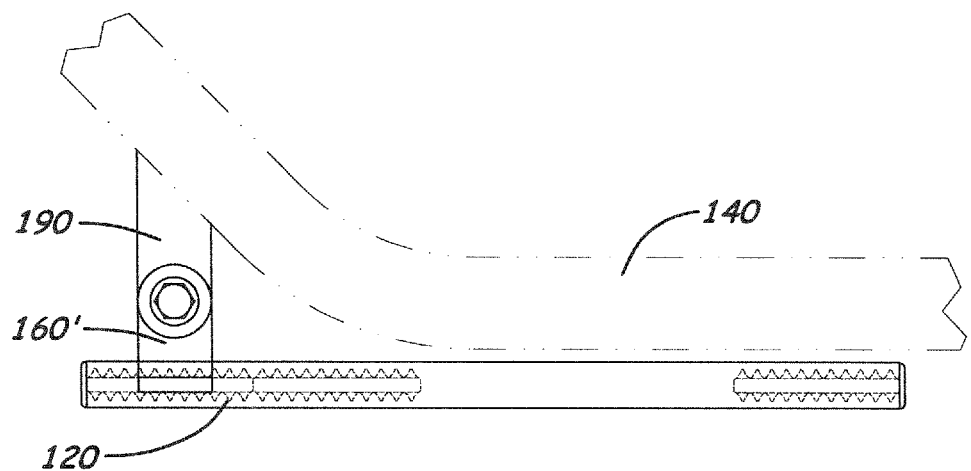
FIG. 6A is a partial, side schematic view of the installation of the invention depicted in FIGS. 2A, 4 and 5.

A partial side schematic view of the embodiment depicted in FIGS. 2A, 4 and 5 is depicted in FIG. 6A. Again, in this Figure it is clear that heat exchanger 120 is placed substantially horizontally beneath right bottom frame tube 140 by connection to longer receiving tab 190.

Figure 6B:
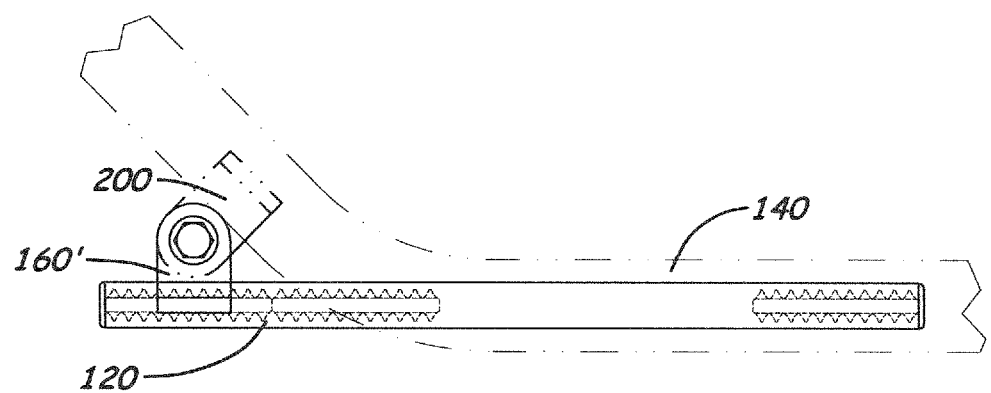
FIG. 6B is a partial, side schematic view of the installation of the invention depicted in FIGS. 2B and 3.

A partial side schematic view of the embodiment depicted in FIG. 2B is depicted in FIG. 6B. From this Figure it is clear that heat exchanger 120 is placed substantially horizontally at the same level as right bottom frame tube 140 by connection to shorter receiving tab 200.

In this description, "substantially horizontal" means inclined less than 45 degrees from the horizontal plane. The preferred position for the oil cooler heat exchanger is horizontal, but it may be slanted less than 45 degrees, for example, it may be slightly inclined either slanting slightly downwardly forward towards the front of the motorcycle, or slanting slightly downwardly backward towards the back of the motorcycle. In any event, the slant from horizontal is less than 45 degrees.

Likewise, "substantially vertical" means inclined more than 45 degrees from the horizontal plane.

"Suspended" means attached so that there is a space between the top surface of the oil cooler heat exchanger and the bottom of the engine and/or crankcase and/or oil pan and/or gearbox, said space existing substantially entirely from the front of the heat exchanger to the back of the heat exchanger, and/or said space existing substantially entirely from the front of the heat exchanger to one or both sides of the heat exchanger. See FIG. 5. This way, heat exchange may be obtained from both the top surface and the bottom surface of the heat exchanger.

When describing the prior art, by "in front of the engine;" I mean in front of and at about the same elevation as the engine. When describing the oil cooler heat exchanger of the invention, it may actually extend "in front of the engine" in a forward sense (for example, extending forward of a vertical plane at the engine's front extremity), but in any case, it extends at least partly to a lower elevation than the engine.

By "beneath," then, I mean at a lower elevation than. This way, the oil cooler heat exchanger may be placed anywhere lower than the engine and/or crankcase and/or oil pan and/or gearbox from behind the front wheel to in front of the rear wheel of the motorcycle.

The oil cooler heat exchanger of the present invention may be made from conventional materials by conventional techniques. A preferred type of heat exchanger is described in U.S. Pat. Nos. 5,303,770 and 5,383,517 to Dierbeck.

The heat exchanger of the present invention may be installed by conventional techniques, for example, with conventional lugs, tabs, welds, nuts, bolts or screws. Original equipment manufacture (OEM) or after-market designs may be implemented.

The heat exchanger of the present invention may be for water cooling or for oil cooling, or for any other heat exchange fluid, liquid or gas. Also, an optional, supplemental fan may be installed on or near the exchanger to increase air flow across the heat exchanger surfaces, or to provide air flow when the motorcycle is not in motion.

The heat exchanger of the present invention may be of many shapes and sizes. The embodiment depicted in FIGS. 3-6, for example, is cut-out near its midsection to fit around the bottom of the engine and/or crankcase and/or oil pan and/or gearbox with bottom surface 180 shown in FIG. 4.

The heat exchanger of the present invention may be installed on other vehicles besides motorcycles, for example, cars, trucks, buses, trains, planes, ATV's, farm tractors, etc., with the result being an effective, secure and aesthetic heat exchanger for a vehicle.

Although this invention has been described above with reference to particular means, materials and embodiments, it is to be understood that the invention is not limited to these disclosed particulars, but extends instead to all equivalents within the scope of the following claims.

I claim:

1. A motorcycle with an engine and with an engine cooling circuit, the engine having a bottom side which faces the ground when the motorcycle is oriented in an upright position, the motorcycle comprising:
   a motorcycle frame;
   fluid connectors for the engine cooling circuit; and,
   a heat exchanger having a core including finned tubular core elements fluidly connected to the engine cooling circuit via said fluid connectors for the engine cooling circuit, the heat exchanger core further having a generally planar top area defining a top plane and a generally planar bottom area defining a bottom plane, the heat exchanger being installed on the motorcycle frame and being suspended directly beneath the engine such that each of said top area and of said bottom area of the core has a substantially horizontal orientation when the motorcycle is in an upright position and such that a space is formed between the top area of the core and the bottom side of the engine so that cooling air may pass over the top area and over the bottom area of the core and so that cooling air may also pass through said space between the top area of the core and the bottom side of the engine, at least when the motorcycle is in motion;
   wherein the heat exchanger is not attached directly to the engine except by said fluid connectors for the engine cooling circuit.

2. The motorcycle of claim 1 wherein the heat exchanger is an engine oil intercooler.

3. The motorcycle of claim 1 wherein the heat exchanger is an engine cooling water radiator.

4. The motorcycle of claim 1 wherein said frame comprises a right bottom frame tube and a left bottom frame tube, and the heat exchanger core is installed beneath said right bottom frame tube and said left bottom frame tube.

5. The motorcycle of claim 1 wherein said frame comprises a right bottom frame tube and a left bottom frame tube, and the heat exchanger core is installed between said right bottom frame tube and said left bottom frame tube.

6. The motorcycle of claim 1, wherein said frame comprises a right bottom frame tube and a left bottom frame tube, and the motorcycle further comprises mounting tabs connected to the heat exchanger, to the right bottom frame tube, and to the left bottom frame tube, wherein the mounting tabs are configured to suspend the heat exchanger core beneath said right bottom frame tube and a left bottom frame tube.

7. The motorcycle of claim 1, wherein said frame comprises a right bottom frame tube and a left bottom frame tube, and the motorcycle further comprises mounting tabs connected to the heat exchanger, to the right bottom frame tube, and to the left bottom frame tube, wherein the mounting tabs are configured to suspend the heat exchanger core between said right bottom frame tube and a left bottom frame tube.

* * * * *